(12) United States Patent
Liu et al.

(10) Patent No.: US 10,955,874 B2
(45) Date of Patent: Mar. 23, 2021

(54) MULTI-SCREEN DISPLAY DEVICE

(71) Applicant: CHAMP VISION DISPLAY INC., Miao-Li County (TW)

(72) Inventors: Chin-Ku Liu, Miao-Li County (TW); Chung-Hao Wu, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 0 days.

(21) Appl. No.: 16/817,640

(22) Filed: Mar. 13, 2020

(65) Prior Publication Data

US 2020/0293087 A1    Sep. 17, 2020

(51) Int. Cl.
| | |
|---|---|
| *G06F 1/16* | (2006.01) |
| *G02B 5/30* | (2006.01) |
| *G02B 5/04* | (2006.01) |
| *G09F 9/302* | (2006.01) |
| *G02B 27/10* | (2006.01) |

(52) U.S. Cl.
CPC .......... *G06F 1/1609* (2013.01); *G02B 5/045* (2013.01); *G02B 5/3066* (2013.01); *G02B 27/1066* (2013.01); *G09F 9/3023* (2013.01)

(58) Field of Classification Search
CPC ......... G06F 1/16; G02B 5/045; G02B 6/0038; G02B 5/3066; G09F 9/3023
See application file for complete search history.

(56) References Cited

U.S. PATENT DOCUMENTS

| | | | |
|---|---|---|---|
| 9,103,524 B2 * | 8/2015 | Geng ................. | G02B 5/045 |
| 2010/0277665 A1 * | 11/2010 | Kuo .................... | G09F 9/301 |
| | | | 349/58 |
| 2011/0164200 A1 * | 7/2011 | Watanabe ........... | G02F 1/13336 |
| | | | 349/58 |
| 2011/0279487 A1 * | 11/2011 | Imamura ............ | G09G 3/342 |
| | | | 345/690 |
| 2018/0040281 A1 * | 2/2018 | Liu .................... | G06F 3/1446 |
| 2019/0121593 A1 | 4/2019 | Liu et al. | |
| 2019/0258444 A1 | 8/2019 | Liu et al. | |

FOREIGN PATENT DOCUMENTS

| CN | 108766255 A | 11/2018 |
|---|---|---|
| TW | I411848 B | 10/2013 |
| TW | I642050 B | 11/2018 |

* cited by examiner

*Primary Examiner* — Christopher E Mahoney (57) ABSTRACT

A multi-screen display device includes a plurality of display screens and a prism structure optical element disposed between two adjacent display screens. The prism structure optical element includes a substrate and a plurality of prism columns. The substrate includes a first region and a second region adjacent to each other, and the lengths of the first and second regions are respectively La and Lb, and La≥Lb. The prism columns include a plurality of first and second prism columns in the first and second regions respectively. Each first prism columns has two interior angles θa1, θa2, a first surface and a second surface. Each second prism columns has two interior angles θb1, θb2, a third surface and a fourth surface. The second and/or fourth surfaces are light absorbing surfaces, or a roughness of the second and fourth surfaces is greater than that of the first and third surfaces.

12 Claims, 12 Drawing Sheets

MULTI-SCREEN DISPLAY DEVICE

CROSS-REFERENCE TO RELATED APPLICATION

THIS APPLICATION CLAIMS THE PRIORITY BENEFIT OF CHINA APPLICATION (CN201910193139.5 FILED ON 2019 Mar. 14). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a display device, and more particularly to a multi-screen display device.

BACKGROUND OF THE INVENTION

Anyone who has used a multi-screen display device knows the convenience of a multi-screen display device. Because using the multi-screen can receive more messages from the screens at the same time to achieve rapid analysis and integration of the multiplex effect, the multi-screen display device has been widely used in specific industries such as stock and securities. For a general work, using the multi-screen can also help to improve work efficiency. In addition, the multi-screen output at the same time allows users to adjust the size of the image they want to watch, so as to enjoy different visual perception. Moreover, the current high-end graphics card almost supports all multi-screen output, thus after buying more than one screen, users can splicing out the desired display configuration, enjoy better viewing quality. In addition, in the audio and video entertainment market, multi-screen display is one of the key players wants to enjoy.

On the other hand, in the display industry, curved screens are considered as one of the key development projects. Because the curved screen has an immersed experience, the curved surface is designed so that the viewer feels as if he or she is surrounded by a zero dead angle, and the visual effect is more vivid when the depth of field becomes larger or the viewing distance becomes closer.

However, both the flat screen and the curved screen include a border around the display area. When using multi-screen splicing, the border at the splicing may affect viewing quality.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a multi-screen display device to improve the problem that the border of the screen affects the display quality.

Other objectives and advantages of the invention can be further understood from the technical features disclosed in the invention.

In order to achieve one or a part or all of the above or other objectives, a multi-screen display device according to an embodiment of the invention includes a plurality of display screens and at least one prism structure optical element. The plurality of display screens are arranged adjacent to each other, and at least adjacent two display screens of the plurality of display screens have an included angle. The included angle is greater than 90 degrees and less than 180 degrees. Each of the plurality of display screens has a display area and a border surrounding the display area. Each of the at least one prism structure optical element is disposed between the adjacent two display screens having the included angle and covers two side edges adjacent to each other of the borders of the adjacent two display screens and a part of the display areas of the adjacent two display screens. Each of the at least one prism structure optical element includes a substrate and a plurality of prism columns. The prism columns are arranged on the substrate in a predetermined direction. An extending direction of each of the prism columns substantially parallel to the two side edges adjacent to each other. The substrate includes a first region and a second region adjacent to each other. The first region and the second region respectively correspond to part of the adjacent two display screens. A length of the first region in the predetermined direction is La, a length of the second region in the predetermined direction is Lb, and La≥Lb. The prism columns include a plurality of first prism columns arranged in the first region and a plurality of second prism columns arranged in the second region. Each of the first prism columns has two interior angles $\theta a1$, $\theta a2$, a first surface and a second surface. The two interior angles $\theta a1$, $\theta a2$ are adjacent to the substrate. The interior angle $\theta a1$ is located between the interior angle $\theta a2$ and the second region. The interior angle $\theta a1$ is an included angle between the first surface and the substrate. The interior angle $\theta a2$ is an included angle between the second surface and the substrate. Each of the second prism columns has two interior angles $\theta b1$, $\theta b2$, a third surface and a fourth surface. The two interior angles $\theta b1$, $\theta b2$ are adjacent to the substrate. The interior angle $\theta b1$ is located between the interior angle $\theta b2$ and the first region. The interior angle $\theta b1$ is an included angle between the third surface and the substrate. The interior angle $\theta b2$ is an included angle between the fourth surface and the substrate. The second surfaces and/or the fourth surfaces are light absorbing surfaces, or a roughness of the second surfaces and the fourth surfaces is greater than a roughness of the first surfaces and the third surfaces.

In summary, the multi-screen display device of the embodiment of the invention has a prism structure optical element which covers two side edges adjacent to each other of the two borders and a part of the display areas of the adjacent two display screens. The prism structure optical element can guide the light emitted from the part of the display area covered by the prism structure optical element to the viewer's eyes. As such, the viewer is less likely to perceive the borders and the prism structure optical element between the adjacent two display screens when viewing the stitching image frame formed by the plurality of display screens. In addition, the ghosting caused by the light passing through the second surface and the fourth surface can be reduced by making the second surface and/or the fourth surface of the prism column as a light absorbing surface or making the roughness of the second surface and the fourth surface larger than the roughness of the first surface and the third surface.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
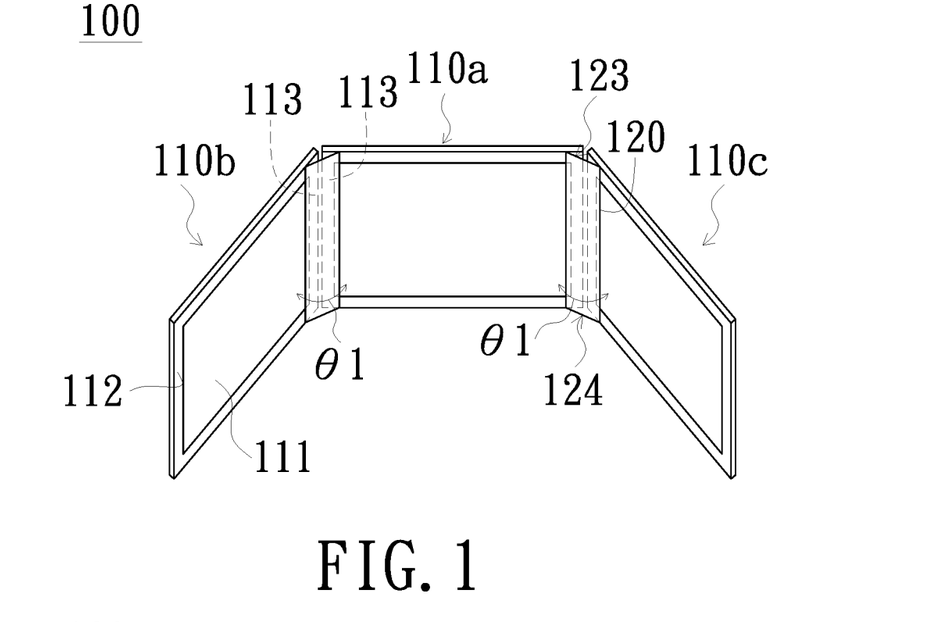
FIG. 1 is a schematic view of a multi-screen display device according to an embodiment of the invention.

FIG. 1 is a schematic view of a multi-screen display device according to an embodiment of the invention. Referring to FIG. 1, the multi-screen display device 100 of the embodiment includes a prism structure optical element 120 and a plurality of display screens, wherein FIG. 1 illustrates three display screens 110a, 110b and 110c as an example. The display screens 110a, 110b and 110c are arranged adjacent to each other. An included angle θ1 is formed between at least adjacent two display screens of the display screens 110a, 110b and 110c, wherein the included angle θ1 is greater than 90 degrees and less than 180 degrees. In the embodiment, an included angle θ1 is formed between the adjacent two display screens 110a, 110b, and an included angle θ1 is also formed between the adjacent two display screens 110a, 110c. The angle of the included angle θ1 may be determined according to different design requirements. In addition, each of the display screens 110a, 110b and 110c has a display area 111 and a border 112 surrounding the display area 111. The display screens 110a, 110b and 110c in the embodiment may be various types of display screens, such as a liquid crystal display screen and an organic light-emitting diode display screen, but not limited thereto. The display screens 110a, 110b and 110c may be a flat screen or a curved screen.

The prism structure optical element 120 is disposed between the adjacent two display screens having the included angle θ1, for example, between the display screens 110a, 110b and between the display screens 110a, 110c. That is, the quantity of the prism structure optical elements 120 may be one or more, and one prism structure optical element 120 may be disposed between any adjacent two display screens having the included angle θ1. In other embodiments, it is to determine whether to dispose the prism structure optical element 120 between adjacent two display screens having the included angle θ1 among the display screens according to design requirements. For example, the prism structure optical element 120 is disposed between the display screens 110a, 110b but is not disposed between the display screens 110a, 110c. In addition, each prism structure optical element 120 covers the two side edges 113 adjacent to each other of the two borders 112 and a part of the two display areas 111 of the corresponding adjacent two display screens. For example, the prism structure optical element 120 corresponding to the display screens 110a, 110b is disposed in a manner of being inclined with respect to the two side edges 113 adjacent to each other of the display screens 110a, 110b and a part of the two display areas 111 of the display screens 110a, 110b respectively, so as to cover the two side edges 113 adjacent to each other of the two borders 112 of the display screen 110a, 110b and a part of the two display areas 111 of the display screens 110a, 110b at the same time. The prism structure optical element 120 corresponding to the display screens 110a, 110c is disposed in a manner of being inclined with respect to the two side edges 113 adjacent to each other of the two borders 112 of the display screens 110a, 110c and a part of the two display areas 111 of the display screens 110a, 110c respectively, so as to cover the two side edges 113 adjacent to each other of the two borders 112 of the display screen 110a, 110c and a part of the two display areas 111 of the display screens 110a, 110c at the same time. In other words, the prism structure optical element 120 corresponding to the display screens 110a, 110b is neither parallel nor perpendicular to the display screens 110a, 110b and the prism structure optical element 120 corresponding to the displays 110a, 110c is neither parallel nor perpendicular to the display screens 110a, 110c.

Figure 2:
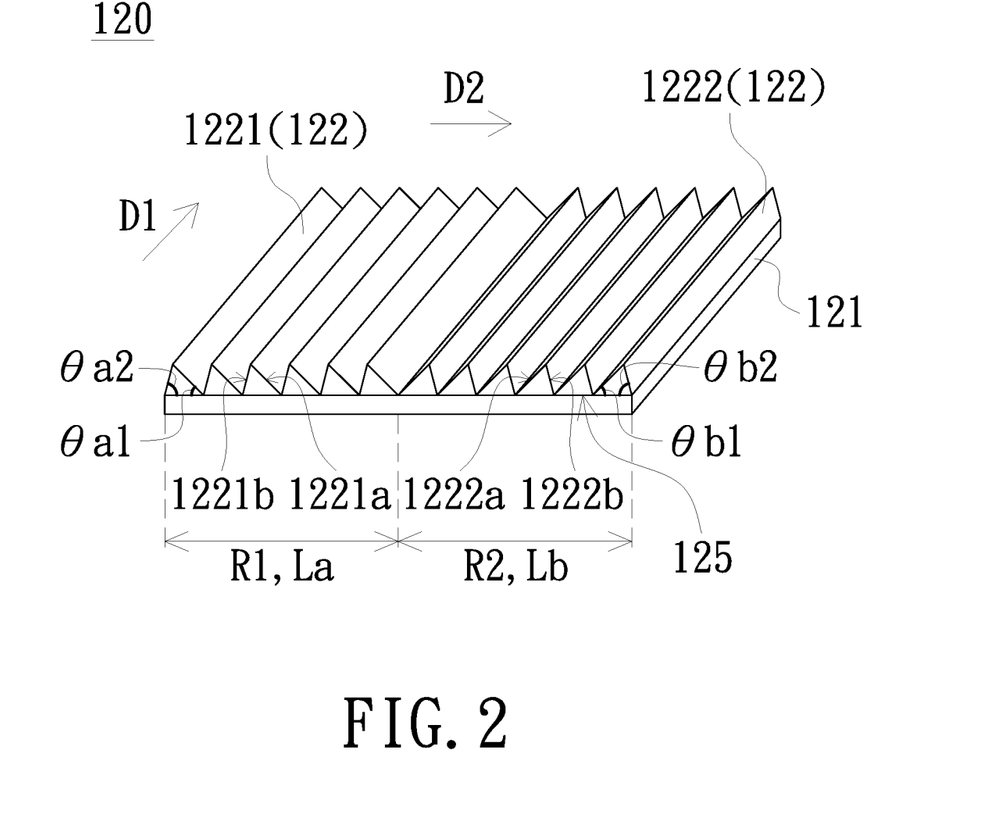
FIG. 2 is a schematic view of a prism structure optical element of a multi-screen display device according to an embodiment of the invention.

FIG. 2 is a schematic view of a prism structure optical element of a multi-screen display device according to an embodiment of the invention. Referring to FIGS. 1 and 2, the prism structure optical element 120 of the embodiment includes a substrate 121 and a plurality of prism columns 122. The prism columns 122 are arranged on the substrate 121 along a predetermined direction D2, and the extending direction D1 of each prism column 122 is substantially parallel to the two side edges 113 adjacent to each other shown in FIG. 1. That is, each prism column 122 extends from the upper end 123 to the lower end 124 of the prism structure optical element 120 in FIG. 1. The extending direction D1 of each prism column 122 is parallel to the longitudinal side edge of the display area 111. The substrate 121 includes a first region R1 and a second region R2 adjacent to each other. The first region R1 and the second region R2 respectively correspond to parts of the two display screens 110a, 110b or 110a, 110c in FIG. 1. The length of the first region R1 in the predetermined direction D2 is La, the length of the second region R2 in the predetermined direction D2 is Lb, and La≥Lb, wherein FIG. 2 is exemplified by La=Lb. In addition, the substrate 121 has, for example, a carrier surface 125 that is away from the adjacent two display screens (e.g., away from the display screens 110a, 110b or away from the display screens 110a, 110c), that is, the carrier surface 125 faces the viewer. The prism columns 122 are disposed on the carrier surface 125 and include a plurality of first prism columns 1221 arranged in the first region R1 and a plurality of second prism columns 1222 arranged in the second region R2. Each first prism column 1221 has two interior angles θa1, θa2, a first surface 1221a and a second surface 1221b, wherein the two interior angles θa1, θa2 are adjacent to the substrate 121. The interior angle θa1 is located between the interior angle θa2 and the second region R2, the interior angle θa1 is the included angle between the first surface 1221a and the substrate 121, and the interior angle θa2 is the included angle between the second surface 1221b and the substrate 121. Each second prism column 1222 has two interior angles θb1, θb2, a third surface 1222a and a fourth surface 1222b, wherein the two interior angles θb1, θb2 are adjacent to the substrate 121. The interior angle θb1 is located between the interior angle θb2 and the first region R1, the interior angle θb1 is the included angle between the third surface 1222a and the substrate 121, and the interior angle θb2 is the included angle between the fourth surface 1222b and the substrate 121. The substrate 121 of the embodiment is, for example, a film, but the invention does not limit the specific shape of the substrate 121. Further, each prism column 122 of the embodiment is, for example, a triangular prism column, but is not limited thereto.

Figure 3:
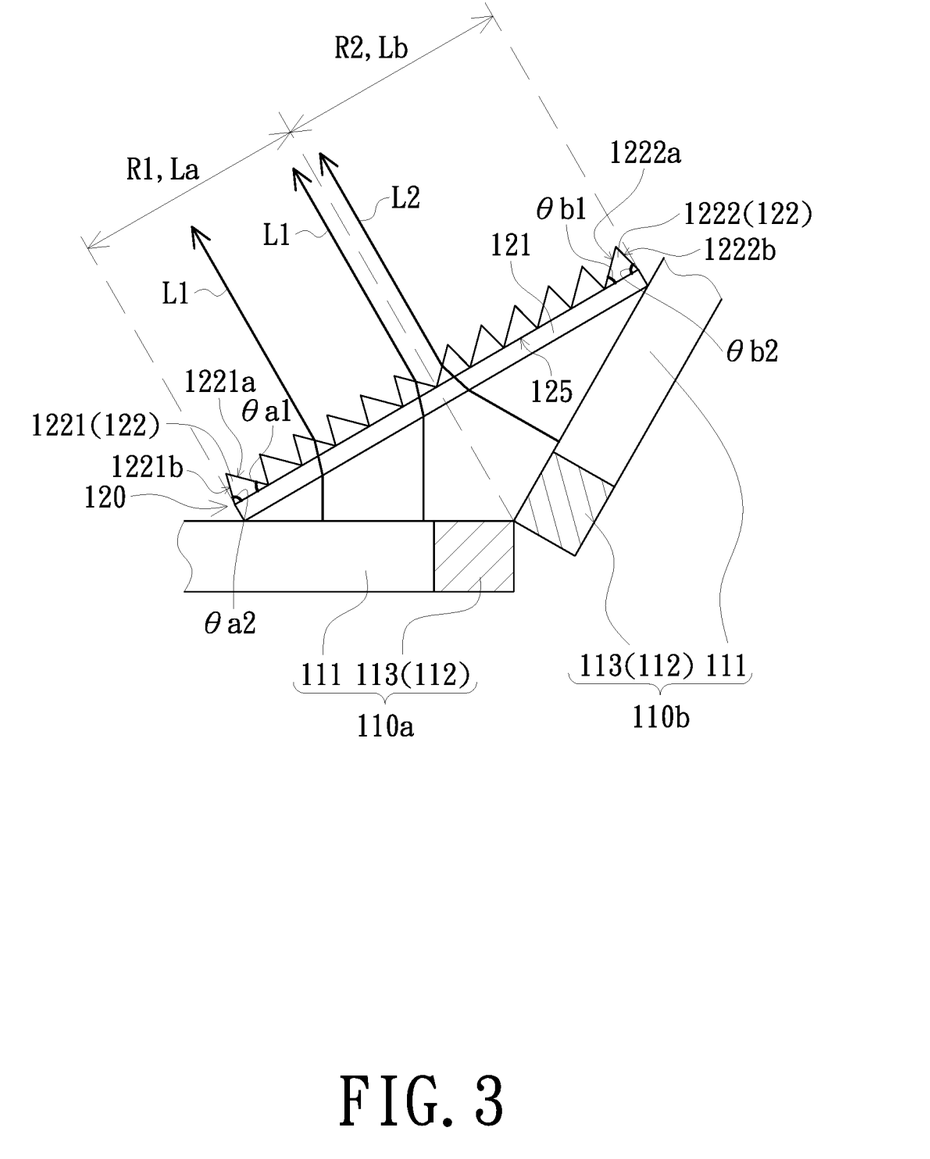
FIG. 3 is a schematic view of an optical path of a forward light of adjacent two display screens passing through a prism structure optical element according to an embodiment of the invention.

FIG. 3 is a schematic view of an optical path of a forward light of adjacent two display screens passing through a prism structure optical element according to an embodiment of the invention. Referring to FIG. 3, the prism structure optical element 120 refracts the light L1 that is forwardly emitted from the display area 111 of the display screen 110a and the light L2 that is forwardly emitted from the display area 111 of the display screen 110b, and the lights L1 and L2 can be also forwardly emitted after passing through the prism structure optical element 120. Specifically, when the light L1 that is forwardly emitted from the display area 111 of the display screen 110a is incident on the first prism column 1221 via the substrate 121, the light L1 is refracted on the first surface 1221a to reach the forward light output (i.e., the light is perpendicular to the carrier surface 125 when it is emitted). Similarly, when the light L2 that is emitted from the display area 111 of the display screen 110b is incident on the second prism column 1222 via the substrate 121, the light L2 is refracted on the third surface 1222a to reach the forward light output. In an embodiment, the two ends of the prism structure optical element 120 covering parts of the two display areas 111 of the adjacent two display screens 110a, 110b are respectively abutted against the display areas 111 of the adjacent two display screens 110a, 110b, thereby being stably fixed to the adjacent two display screens 110a, 110b (as shown in FIG. 3). In another embodiment, the prism structure optical element 120 can also be fixed by other mechanisms such that the two ends of the prism structure optical element 120 covering parts of the two display areas 111 of the adjacent two display screens 110a, 110b are not respectively abutted against the display areas 111 of the adjacent two display screens 110a, the invention is not limited thereto, and no redundant detail is to be given herein for the following similar figures. Through the refraction of the prism structure optical element 120, the regions corresponding to the adjacent two side edges 113 of the two borders 112 of the adjacent two display screens 110a, 110b also have the lights L1, L2 transmitted toward the viewer, so the viewer does not see the adjacent two side edges 113 of the two borders 112 of the adjacent two display screens 110a, 110b. As such, the viewer can see a good stitching image frame when the adjacent two display screens 110a, 110b jointly display the image frame due to that the display quality is not affected by the borders 112. Similarly, since the prism structure optical element 120 is also disposed between the adjacent two display screens 110a and 110c in FIG. 1, the display quality is not affected by the borders 112.

The first prism column 1221 has a first surface 1221a and a second surface 1221b. Since the light L1 forwardly emitted from a part of the display region 111 of the display screen 110a covered by the prism structure optical element 120 is emitted from the first surface 1221a of the first prism column 1221, the second surface 1221b corresponding to the first surface 1221a of the display area 111 of the display screen 110a is less likely to emit light with higher energy, and thus has a problem of lower brightness. Further, the viewer may perceive a slight ghosting due to that the direction of the light emitted from the second surface 1221b is different from the direction of the light L1 emitted from the first surface 1221a. Similarly, the second prism column 1222 has a third surface 1222a and a fourth surface 1222b. Since the light L2 forwardly emitted from a part of the display region 111 of the display screen 110b covered by the prism structure optical element 120 is emitted from the third surface 1222a of the second prism column 1222, the fourth surface 1222b corresponding to the third surface 1222a of the display area 111 of the display screen 110b is less likely to emit light with higher energy, and thus has a problem of lower brightness. Further, the viewer may perceive a slight ghosting due to that the direction of the light emitted from the fourth surface 1222b is different from the direction of the light L2 emitted from the third surface 1222a.

Referring to FIG. 2 and FIG. 3, in order to improve the above problems, the prism structure optical element 120 of the embodiment has the following designs: the relationship between the two interior angles $\theta a1$, $\theta a2$ of each first prism column 1221 is $\theta a1 < \theta a2$; the relationship between the two interior angles $\theta b1$, $\theta b2$ of each second prism column 1222 is $\theta b1 < \theta b2$; the angles of the interior angles $\theta a1$, $\theta a2$ of the first prism column 1221 are the same; and the angles of the interior angles $\theta b1$, $\theta b2$ of the second prism column 1222 are the same.

In the embodiment, the first region R1 of each prism structure optical element 120 corresponds to, for example, the display screen 110a located in the middle among the display screens 110a, 110b and 110c in FIG. 1. In addition, the prism column 122 is, for example, a triangular prism column, and the interior angles $\theta a1$, $\theta a2$, $\theta b1$, and $\theta b2$ also satisfy the following relationship: $40° \leq \theta a1 \leq 70°$, $60° \leq \theta a2 \leq 90°$, $40° \leq \theta b1 < 70°$ and $60° \leq \theta b2 \leq 90°$.

In the first prism column 1221, by designing the interior angle $\theta a2$ to be larger than the interior angle $\theta a1$, the orthographic projection area of the first surface 1221a adjacent to the interior angle $\theta a1$ on the substrate 121 is larger than the orthographic projection area of the second surface 1221b adjacent to the interior angle $\theta a2$ on the substrate 121. Therefore, most of the light L1 forward emitted from the display area 111 of the display screen 110a can exit from the first surface 1221a, and thus not only increasing the brightness but also improving the ghosting caused by the light exiting from the second surface 1221b. Similarly, in the second prism column 1222, by designing the interior angle $\theta b2$ to be larger than the interior angle $\theta b1$, the orthographic projection area of the third surface 1221a adjacent to the interior angle $\theta b1$ on the substrate 121 is larger than the orthographic projection area of the fourth surface 1222b adjacent to the interior angle $\theta b2$ on the substrate 121. Therefore, most of the light L2 emitted forward from the display area 111 of the display screen 110b can exit from the third surface 1222a, and thus not only increasing the brightness but also improving the ghosting caused by the light exiting from the fourth surface 1222b.

In addition to the above-described designs of interior angle, the prism structure optical element 120 of the embodiment can also design the roughness of the second surface 1221b and the fourth surface 1222b to be larger than the roughness of the first surface 1221a and the third surface 1222a. Since the second surface 1221b and the fourth surface 1222b have a higher roughness, the light passing through the second surface 1221b and the fourth surface 1222b can be diverged, so as to reduce the ghosting caused by the light L1 passing through the second surface 1221b and the light L2 passing through the fourth surface 1222b.

Alternatively, at least one of the second surface 1221b and the fourth surface 1222b is designed as a light absorbing surface. Specifically, for example, a light absorbing material (not shown) is disposed on the second surfaces 1221b and the fourth surface 1222b by screen printing, inkjet, exposure development, or the like, thereby achieving the effect of light absorbing and avoiding ghosting caused by the light L1, L2 respectively emitted from the second surface 1221b and the fourth surface 1222b.

Figure 4:
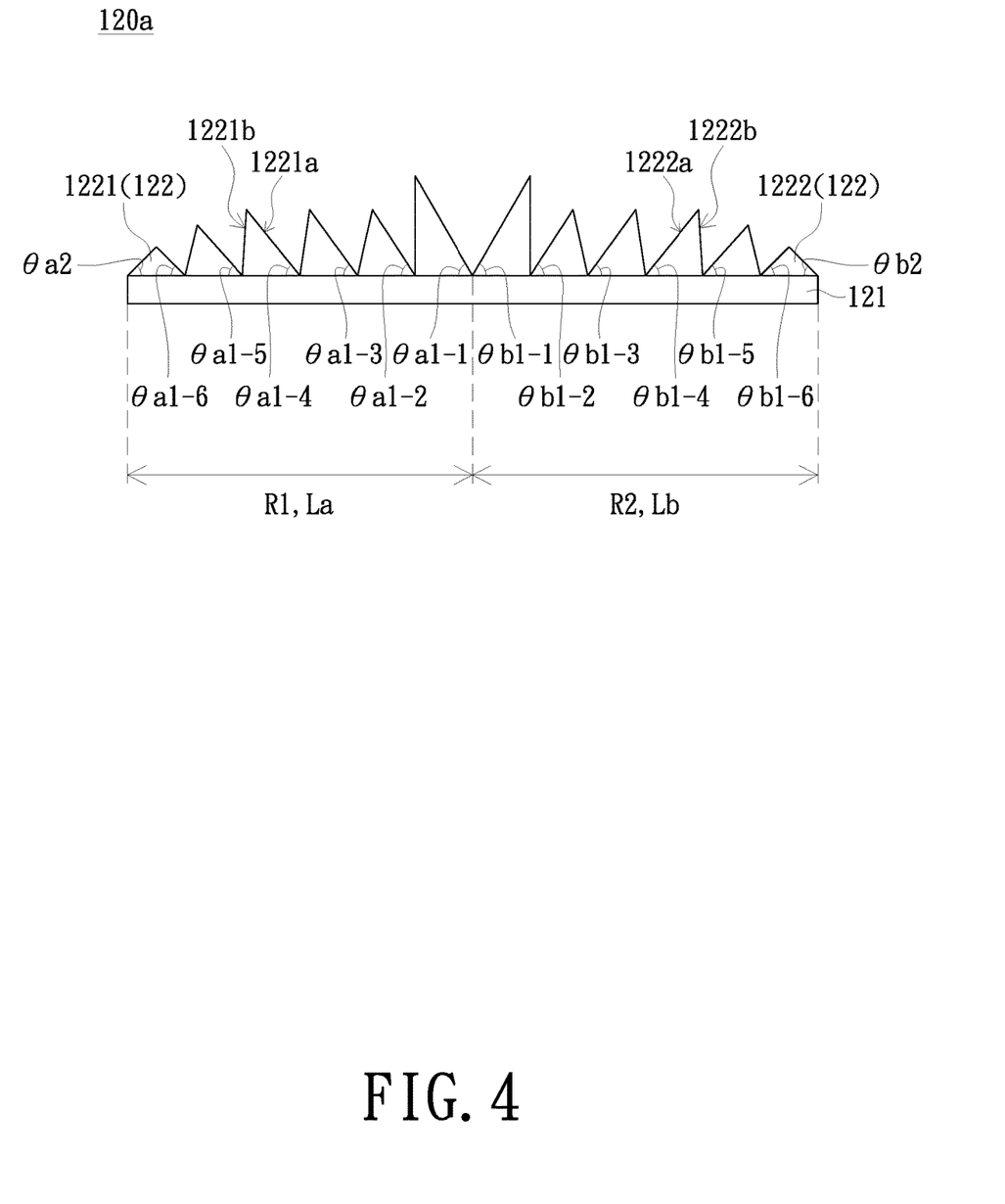
FIG. 4 is a schematic view of a prism structure optical element of a multi-screen display device according to another embodiment of the invention.
Figure 5:
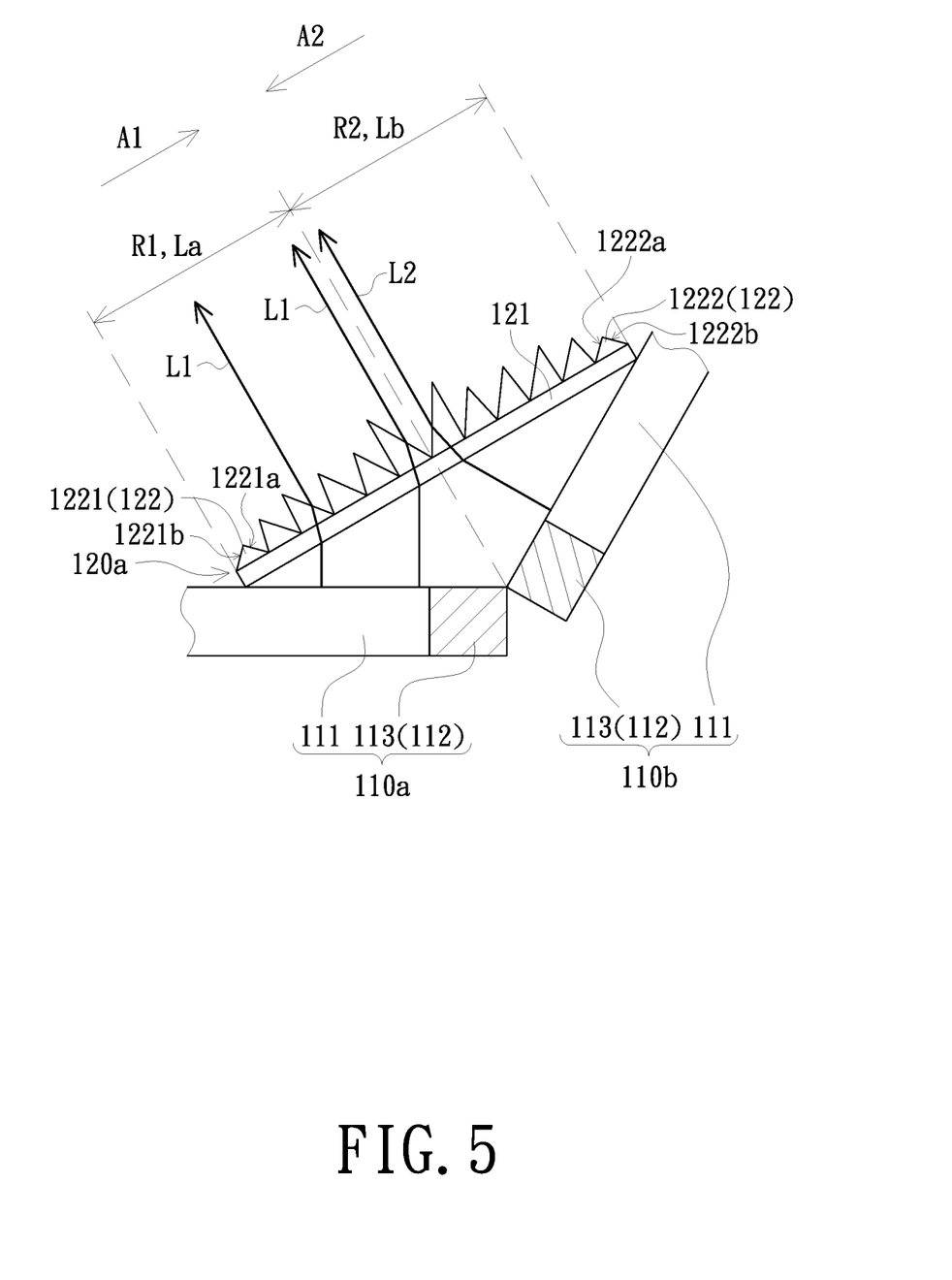
FIG. 5 is a schematic view of the prism structure optical element of FIG. 4 refracting light.

FIG. 4 is a schematic view of a prism structure optical element of a multi-screen display device according to another embodiment of the invention. FIG. 5 is a schematic view of the prism structure optical element of FIG. 4 refracting light. Referring to FIGS. 4 and 5, the prism structure optical element 120a of the embodiment is similar to the prism structure optical element 120 in structure and advantages, and only the main differences of the structure will be described below. In the prism column 122 of the embodiment, the interior angles $\theta a1$ of the first prism columns 1221 are gradually decreased from the boundary between the first region R1 and the second region R2 toward the direction away from the second region R2, and the interior angles $\theta b1$ of the prism columns 1222 are gradually decreased from the boundary between the first region R1 and the second region R2 toward the direction away from the first region R1. In an embodiment, the angles of $\theta a1$, $\theta b1$ are, for example, $0° < \theta a1 \leq 70°$ and $0° < \theta b1 \leq 70°$. The more common design is $45° \leq \theta a1 \leq 60°$ and $45° \leq \theta b1 \leq 60°$. The quantity of the first prism column 1221 and the second prism column 1222 each in FIG. 4 is indicated by six, but not limited thereto. In the embodiment, the relationships of the plurality of interior angles $\theta a1-1$, $\theta a1-2$, $\theta a1-3$, $\theta a1-4$, $\theta a1-5$, $\theta a1-6$ of the plurality of first prism columns 1221 is $\theta a1-1 \geq \theta a1-2 \geq \theta a1-3 \geq \theta a1-4 \geq \theta a1-5 \geq a1-6$ and $\theta a1-1 > \theta a1-6$. In other words, under the condition that the angles of the interior angles $\theta a1-1$ to $\theta a1-6$ are gradually decreased, the angles of any at least adjacent two interior angles may be the same according to different design requirements, for example, $\theta a1-1 > \theta a1-2 = \theta a1-3 > \theta a1-4$. The above description is also applicable to a plurality of interior angles $\theta b1-1$, $\theta b1-2$, $\theta b1-3$, $\theta b1-4$, $\theta b1-5$, $\theta b1-6$ of the plurality of second prism columns 1222, that is, $\theta b1-1 \geq \theta b1-2 \geq \theta b1-3 \geq \theta b1-4 \geq \theta b1-5 \geq \theta b1-6$, and $\theta b1-1 > \theta b1-6$. The lights L1, L2 in FIG. 5 are shown in such a manner as to be forwardly emitted from the display screens 110a, 110b, however, it should be noted that the lights L1, L2 and should actually have a light exit angle with respect to the display screens 110a, 110b. The influence of the designs of interior angles of the prism structure optical element 120a on the change in the brightness of light will be described in detail below.

Figure 6A:
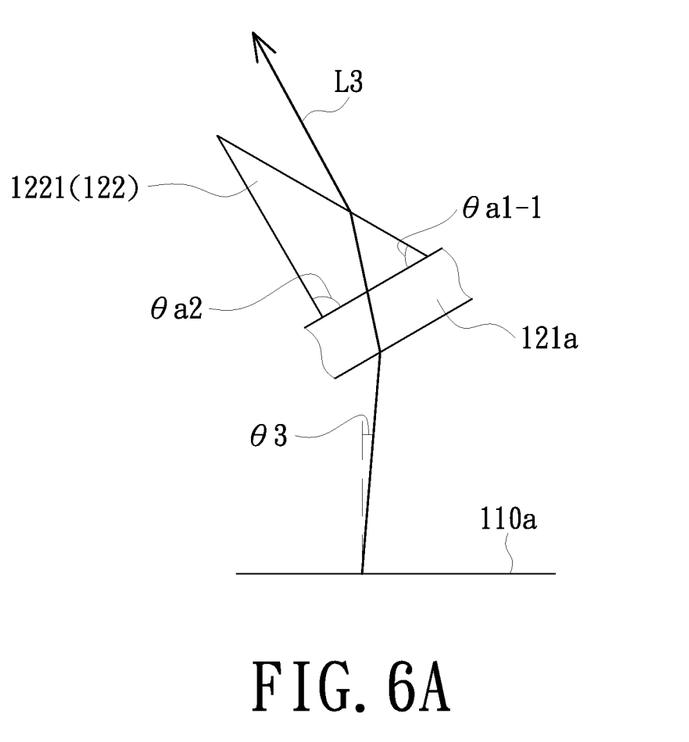
FIG. 6A is an enlarged schematic view of the first prism column in the first region adjacent to the second region in FIG. 5 refracting light.
Figure 6B:
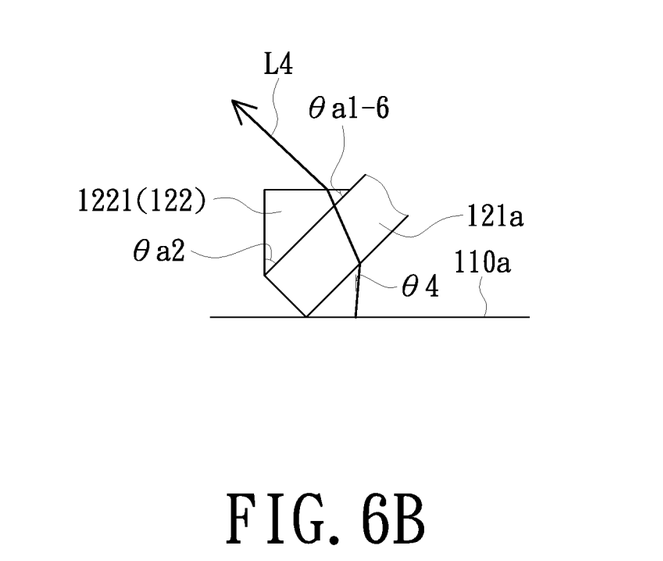
FIG. 6B is an enlarged schematic view of the first prism column in the first region adjacent to the display screen in FIG. 5 refracting light.

FIG. 6A is an enlarged schematic view of the first prism column in the first region adjacent to the second region in FIG. 5 refracting light. FIG. 6B is an enlarged schematic view of the first prism column in the first region adjacent to the display screen in FIG. 5 refracting light. Refer to FIGS. 6A and 6B. The light L3 is emitted from the display screen 110a at the light exit angle $\theta 3$, and then is incident on the first prism column 1221 in the first region R1 of the prism structure optical element 120a adjacent to the second region R2, and then is forwardly emitted from the prism structure optical element 120a after being refracted. The light L4 is emitted from the display screen 110a at the light exit angle $\theta 4$, and then is incident on the first prism column 1221 in the first region R1 of the prism structure optical element 120a adjacent to the display screen 110a, and then is forwardly emitted from the prism structure optical element 120a after being refracted. The light exit angle θ3 is greater than the light exit angle θ4 under the aforementioned design of the first prism column 1221 (e.g., θa1-1>θa1-6). The light having a larger light exit angle has a lower brightness (e.g., the brightness of the light L4 is greater than the brightness of the light L3) due to that the forwardly-emitting light has the highest brightness under the design of the display screen 110a. In other words, the change in brightness exhibited by the light emitted from the first region R1 of the prism structure optical element 120a is gradually decreased in the direction away from the second region R2 toward the second region R2 (direction A1 in FIG. 5A). Similarly, the change in brightness exhibited by the light emitted from the second region R2 of the prism structure optical element 120a is gradually decreased in the direction away from the first region R1 toward the first region R1 (direction A2 in FIG. 5A). In the embodiment, since the brightness of the light emitted from the display screens 110a, 110b is higher than the brightness of the light emitted from the prism structure optical element 120a, the brightness of the light emitted from the prism structure optical element 120a is gradually decreased from both ends of the display screens 110a, 110b to the middle thereof. By such a decrease in brightness, the viewer is less likely to perceive the difference in brightness of the image frame displayed by the display screens 110a, 110b and the prism structure optical element 120a. Similarly, the viewer is less likely to perceive the difference in brightness of the aforementioned image frame when the prism structure optical element 120a is disposed between the display screens 110a, 110c.

Figure 7:
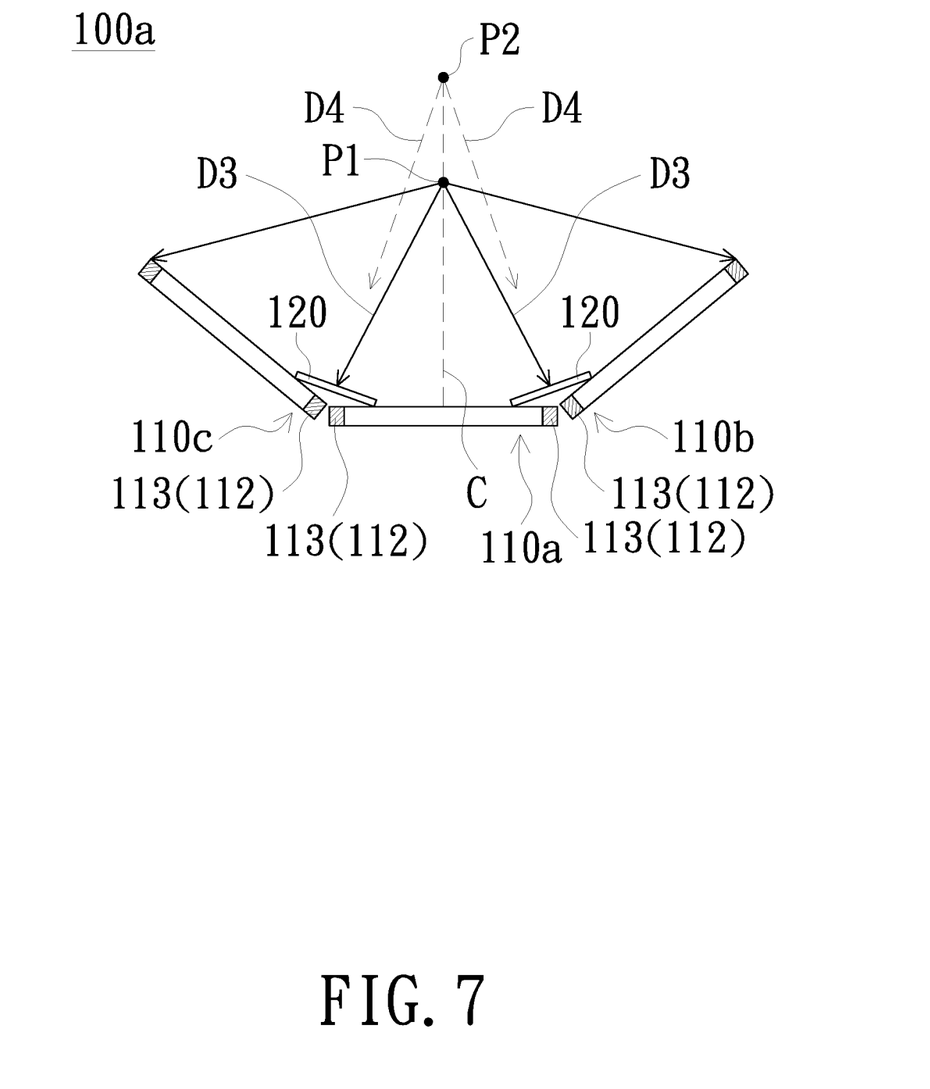
FIG. 7 is a schematic view of a viewer viewing a multi-screen display device at different viewing positions.
Figure 8A:
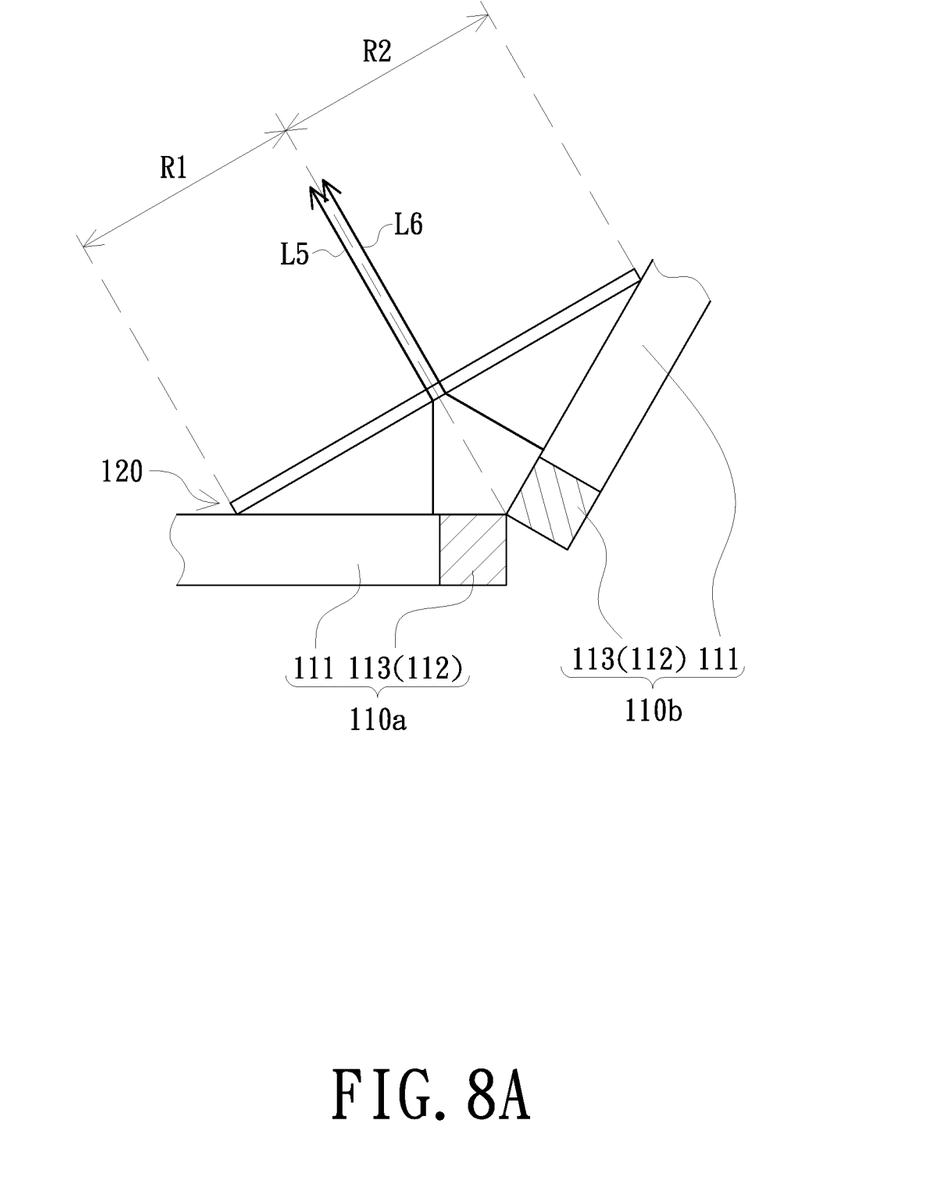
FIG. 8A is a schematic view of a partial optical path when a viewer is at the viewing position P1 in FIG. 7.
Figure 8B:
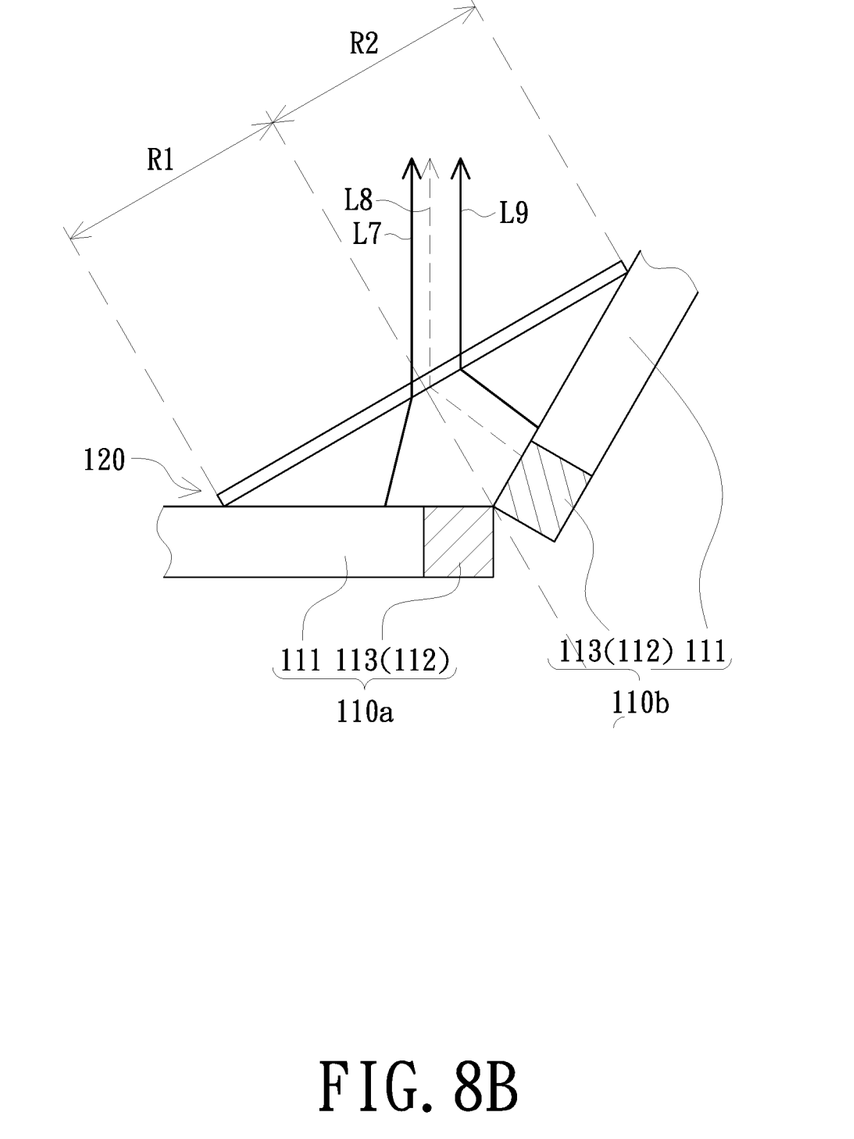
FIG. 8B is a schematic view of a partial optical path when a viewer is at the viewing position P2 in FIG. 7.

FIG. 7 is a schematic view of a viewer viewing a multi-screen display device at different viewing positions. FIG. 8A is a schematic view of a partial optical path when a viewer is at the viewing position P1 in FIG. 7. FIG. 8B is a schematic view of a partial optical path when a viewer is at the viewing position P2 in FIG. 7. Referring to FIGS. 7 and 8A, the multi-screen display device 100a of the embodiment employs two prism structure optical elements 120 of FIG. 2, and there is a preferred viewing position P1 at the center line C of the display screen 110a. The light L5, L6 in FIG. 8A are substantially parallel to the viewing direction D3 of the viewer in FIG. 7 when the viewer is at the viewing position P1. In other words, the viewer receives the lights L5, L6, wherein the light L5 is from the display area 111 of the display screen 110a and is refracted to the viewer via the first region R1 of the prism structure optical element 120 adjacent to the second region R2, while the light L6 is from the display area 111 of the display screen 110b and is refracted to the viewer via the second region R2 of the prism structure optical element 120 adjacent to the first region R1. Therefore, the two side edges 113 adjacent to each other of the two borders 112 of the display screens 110a, 110b are not viewed even if the viewer views toward the boundary of the first region R1 and the second region R2.

Referring to FIGS. 7 and 8B, the viewing direction changes when the viewer is at the viewing position P2 which is relatively far from the display screen 110a, and the lights L7, L8, and L9 in FIG. 8B are substantially parallel to the viewing direction D4 of the viewer in FIG. 7. In other words, the viewer receives the lights L7, L8 and L9, wherein the light L7 is from the display area 111 of the display screen 110a and is refracted to the viewer via the first region R1 of the prism structure optical element 120 adjacent to the second region R2, the light L9 is from the display area 111 of the display screen 110b and is refracted to the viewer via the second region R2 of the prism structure optical element 120. However, the light L9 is from the edge of the display area 111 of the display screen 110b but it is not refracted to the viewer via the second region R2 of the prism structure optical element 120 adjacent to the first region R1. The light L8 refracted to the viewer via the second region R2 of the prism structure optical element 120 adjacent to the first region R1 is from the side edge 113 of the border 112 of the display screen 112 adjacent to the display screen 110a, therefore, the viewer may view the side edge 113 of the border 112 of the display screen 110b adjacent to the display screen 110a. Similarly, the viewer may also view the side edge 113 of the border 112 of the display screen 110c adjacent to the display screen 110a.

Figure 9:
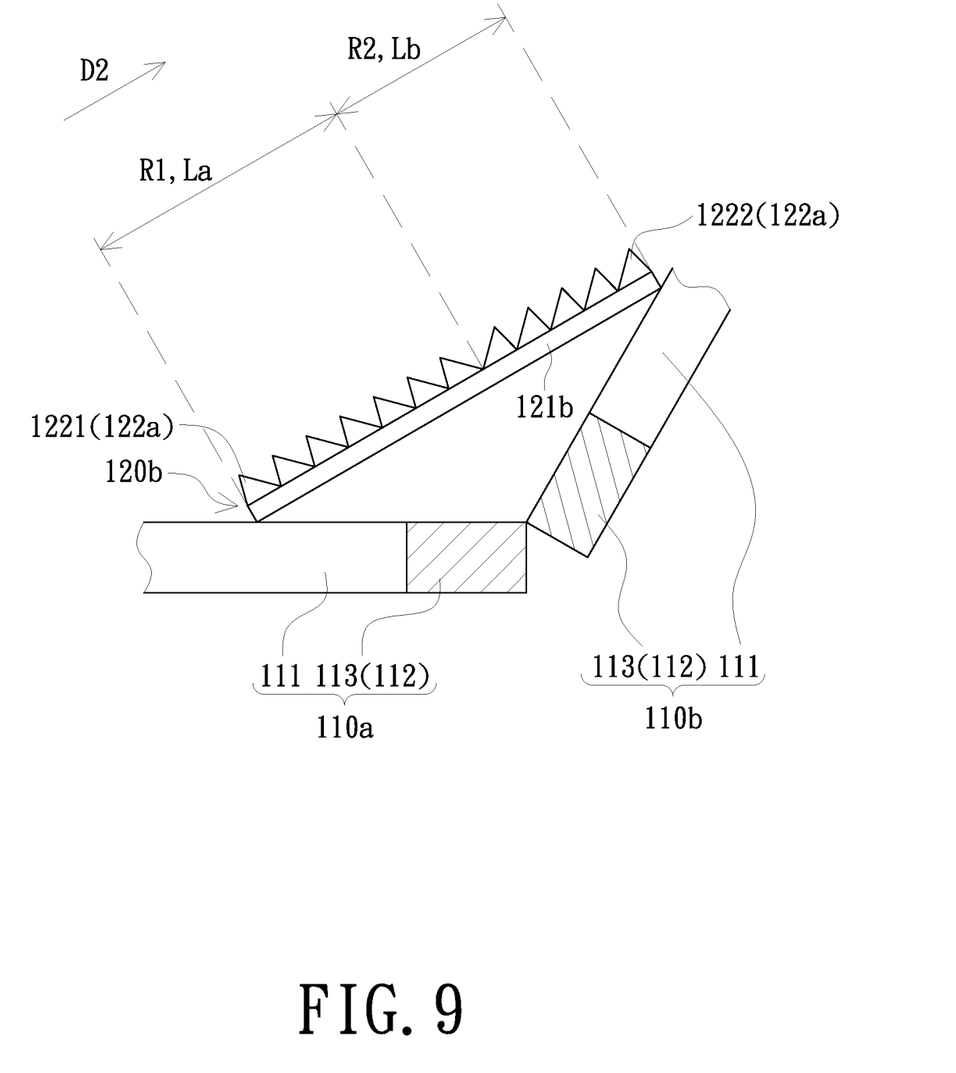
FIG. 9 is a schematic view of a prism structure optical element of a multi-screen display device refracting light according to another embodiment of the invention.

In order to improve the above problem, as shown in FIG. 9, the length La of the first region R1 of the substrate 121b of the prism structure optical element 120b in the predetermined direction D2 is designed to be larger than the length Lb of the second region R2 in the predetermined direction D2. Further, in addition corresponding to a part of one of the two display screens 110a, 110b, the first region R1 also corresponds to a part of the other of the two display screens 110a, 110b. Taking FIG. 9 as an example. In addition corresponding to a part of the display screen 110a, the first region R1 of the prism structure optical element 120b covering the display screens 110a, 110b also corresponds to a part of the display screen 110b. Similarly, in addition corresponding to a part of the display screen 110a, the first region R1 of the prism structure optical element 120b covering the display screens 110a, 110c in FIG. 7 also corresponds to a part of the display screen 110c. In an embodiment, the length La and the length Lb satisfy, for example, the relationship: 1<La/Lb≤1.2.

Figure 10A:
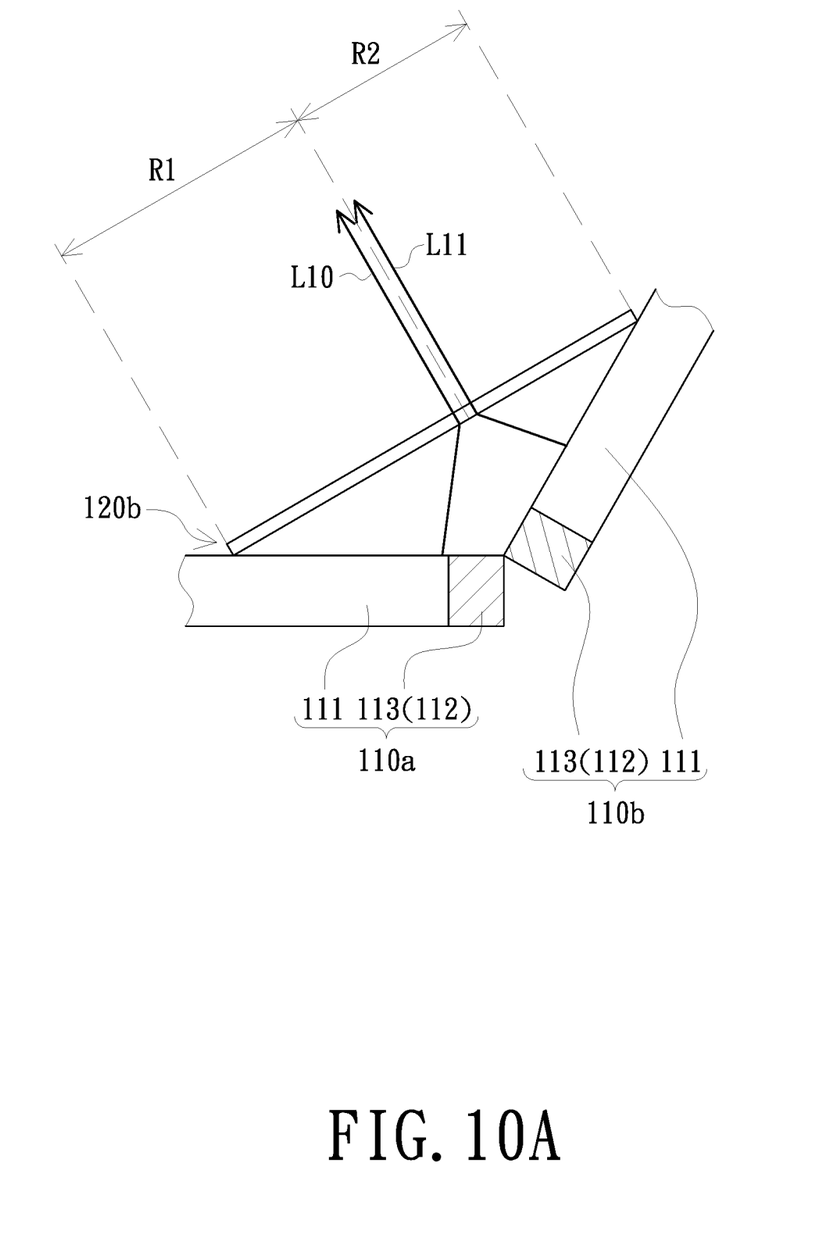
FIG. 10A is a schematic view of a partial optical path when a viewer at a preferred position viewing views the display device in FIG. 9.
Figure 10B:
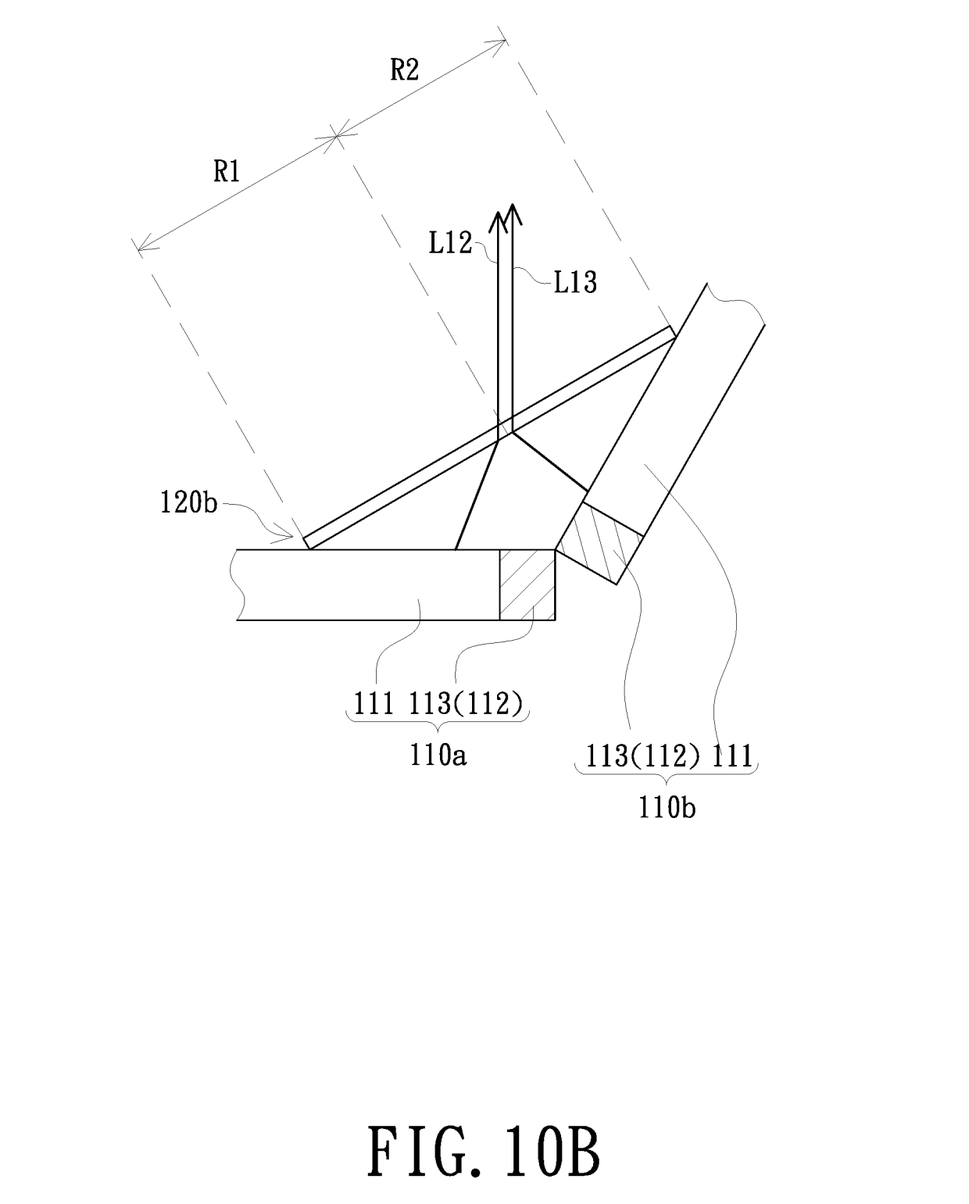
FIG. 10B is a schematic view of a partial optical path when a viewer is at a relatively far viewing position views the display device in FIG. 9.

FIG. 10A is a schematic view of a partial optical path when a viewer at a preferred position viewing views the display device in FIG. 9. FIG. 10B is a schematic view of a partial optical path when a viewer is at a relatively far viewing position views the display device in FIG. 9. Referring first to FIG. 10A, the lights L10, L11 are substantially parallel to the viewing direction of the viewer. In other words, the viewer receives the lights L10, L11, wherein the light L10 is from the display area 111 of the display screen 110a and is refracted to the viewer via the first region R1 of the prism structure optical element 120b adjacent to the second region R2, while the light L11 is from the display area 111 of the display screen 110b and is refracted to the viewer via the second region R2 of the prism structure optical element 120b adjacent to the first region R1. Therefore, the two side edges 113 adjacent to each other of the two borders 112 of the display screens 110a, 110b are not viewed even if the viewer views toward the boundary of the first region R1 and the second region R2.

Referring to FIG. 10B, the viewing direction changes when the viewer is at a viewing position which is relatively far from the display screen 110a than the preferred viewing position, and the lights L12, L13 are substantially parallel to the viewing direction of the viewer. In other words, the viewer receives the lights L12, L13, wherein the light L12 is from the display area 111 of the display screen 110a and is refracted to the viewer via the first region R1 of the prism structure optical element 120b adjacent to the second region R2, the light L13 is from the display area 111 of the display screen 110b and is refracted to the viewer via the second region R2 of the prism structure optical element 120b. Therefore, the two side edges 113 adjacent to each other of the two borders 112 of the display screens 110a, 110b are not viewed even if the viewer views toward the boundary of the first region R1 and the second region R2.

Figure 11:
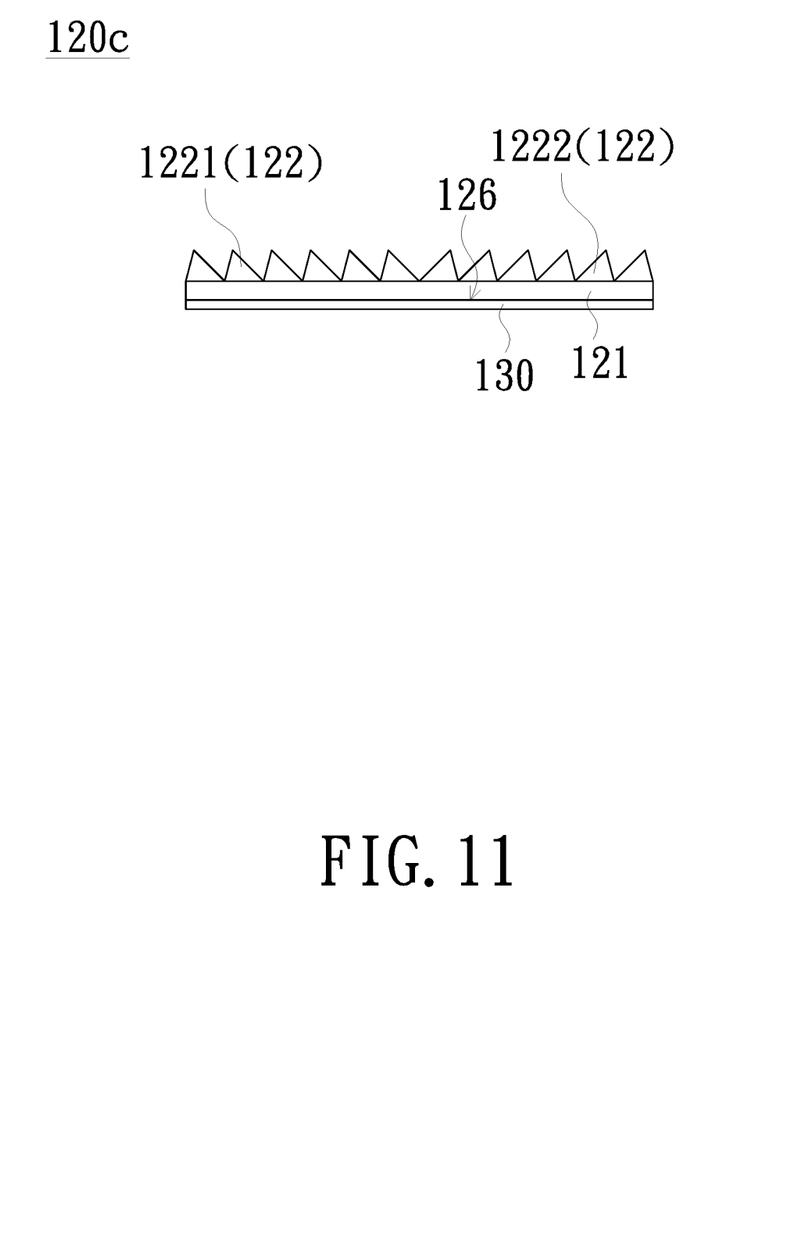
FIG. 11 is a schematic view of a prism structure optical element of a multi-screen display device according to another embodiment of the invention.

FIG. 11 is a schematic view of a prism structure optical element of a multi-screen display device according to another embodiment of the invention. Referring to FIG. 11, the prism structure optical element 120c of the embodiment is similar to the prism structure optical element 120 of FIG. 2. The main difference is that the prism structure optical element 120c further includes a polarizing absorbing material layer 130 disposed on the substrate 121. The polarizing absorbing material layer 130 is disposed, for example, on a surface 126 of the substrate 121 that is away from the prism columns 122. In other embodiments, the polarizing absorbing material layer 130 may be disposed between the prism columns 122 and the substrate 121. The polarizing absorbing material layer 130 can reduce the reflected light formed by the ambient light source. When the display screens 110a, 110b and 110c of FIG. 1 are display screens having an upper polarizer (e.g., a liquid crystal display screen), the polarization direction of the polarizing absorbing material layer 130 is the same as the polarization direction of the upper polarizer. In other words, the transmission axis of the polarizing absorbing material layer 130 is parallel to the transmission axis of the upper polarizer. The polarizing absorbing material layer 130 can be applied to the prism structure optical element of each embodiment of the invention.

In summary, the multi-screen display device of the embodiment of the invention has a prism structure optical element which covers adjacent two side edges of the two borders and a part of the display areas of the adjacent two display screens. The prism structure optical element can guide the light emitted from the part of the display area covered by the prism structure optical element to the viewer's eyes. As such, the viewer is less likely to perceive the borders and the prism structure optical element between the adjacent two display screens when viewing the stitching image frame formed by the plurality of display screens. In addition, the ghosting caused by the light passing through the second surface and the fourth surface can be reduced by making the second surface and/or the fourth surface of the prism column as a light absorbing surface or making the roughness of the second surface and the fourth surface larger than the roughness of the first surface and the third surface.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first prism column, the second prism column, the first surface, the second surface, the first region and the second region are only used for distinguishing various elements and do not limit the number of the elements.

What is claimed is:

1. A multi-screen display device, comprising a plurality of display screens and at least one prism structure optical element, wherein:

the plurality of display screens are arranged adjacent to each other, and at least adjacent two display screens of the plurality of display screens have an included angle, the included angle is greater than 90 degrees and less than 180 degrees, and each of the plurality of display screens has a display area and a border surrounding the display area;

each of the at least one prism structure optical element is disposed between the adjacent two display screens having the included angle and covers two side edges adjacent to each other of the borders of the adjacent two display screens and a part of the display areas of the adjacent two display screens, wherein each of the at least one prism structure optical element comprises a substrate and a plurality of prism columns, the prism columns are arranged on the substrate in a predetermined direction, an extending direction of each of the prism columns substantially parallel to the two side edges adjacent to each other, the substrate comprises a first region and a second region adjacent to each other, the first region and the second region respectively correspond to part of the adjacent two display screens, a length of the first region in the predetermined direction is La, a length of the second region in the predetermined direction is Lb, and La≥Lb, the prism columns comprise a plurality of first prism columns arranged in the first region and a plurality of second prism columns arranged in the second region, each of the first prism columns has two interior angles $\theta a1$, $\theta a2$, a first surface and a second surface, the two interior angles $\theta a1$, $\theta a2$ are adjacent to the substrate, the interior angle $\theta a1$ is located between the interior angle $\theta a2$ and the second region, the interior angle $\theta a1$ is an included angle between the first surface and the substrate, the interior angle $\theta a2$ is an included angle between the second surface and the substrate, each of the second prism columns has two interior angles $\theta b1$, $\theta b2$, a third surface and a fourth surface, the two interior angles $\theta b1$, $\theta b2$ are adjacent to the substrate, the interior angle $\theta b1$ is located between the interior angle $\theta b2$ and the first region, the interior angle $\theta b1$ is an included angle between the third surface and the substrate, and the interior angle θb2 is an included angle between the fourth surface and the substrate, wherein the second surfaces and/or the fourth surfaces are light absorbing surfaces, or a roughness of the second surfaces and the fourth surfaces is greater than a roughness of the first surfaces and the third surfaces.

2. The multi-screen display device according to claim 1, wherein La>Lb, and the first region corresponds to a part of one of the adjacent two display screens and also corresponds to a part of another one of the adjacent two display screens.

3. The multi-screen display device according to claim 1, wherein 1≤La/Lb≤1.2.

4. The multi-screen display device according to claim 1, wherein θa1<θa2 and θb1<θb2.

5. The multi-screen display device according to claim 1, wherein angles of the interior angles θa1, θa2 of the first prism columns are the same, and angles of the interior angles θb1, θb2 of the second prism columns are the same.

6. The multi-screen display device according to claim 5, wherein the prism columns are triangular prism columns, and 40°≤θa1<70°, 60°≤θa2≤90°, 40°≤θb1<70°, 60°≤θb2≤90°.

7. The multi-screen display device according to claim 1, wherein the interior angles θa1 of the first prism columns are gradually decreased in a direction from a boundary between the first region and the second region to away from the second region, and the interior angles θb1 of the second prism columns are gradually decreased in a direction from the boundary between the first region and the second region to away from the first region.

8. The multi-screen display device according to claim 7, wherein the prism columns are triangular prism columns, and 0°<θa1≤70°, 0°<θb1≤70°.

9. The multi-screen display device according to claim 8, wherein 45°≤θa1≤60°, 45°≤θb1≤60°.

10. The multi-screen display device according to claim 1, wherein a quantity of the display screens is three, a quantity of the prism structure optical elements is two, and the first regions of the prism structure optical elements correspond to the display screen located in the middle of the display screens.

11. The multi-screen display device according to claim 1, wherein each of the prism structure optical elements further comprises a polarizing absorbing material layer disposed on the substrate, each of the display screens has an upper polarizer, and a polarizing direction of the polarizing absorbing material layer is the same as a polarizing direction of the upper polarizers.

12. The multi-screen display device according to claim 11, wherein the polarizing absorbing material layer is disposed on a surface of the substrate away from the prism columns.

* * * * *